United States Patent
Zhu

(10) Patent No.: US 7,268,561 B2
(45) Date of Patent: Sep. 11, 2007

(54) USB ATTACH DETECTION FOR USB 1.1 AND USB OTG DEVICES

(75) Inventor: Xiaoming Zhu, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 458 days.

(21) Appl. No.: 10/945,465

(22) Filed: Sep. 20, 2004

(65) Prior Publication Data

US 2006/0075152 A1 Apr. 6, 2006

(51) Int. Cl.
*G01R 31/04* (2006.01)
(52) U.S. Cl. .......................... 324/538; 710/15
(58) Field of Classification Search ............... 324/538; 710/15
See application file for complete search history.

(56) References Cited

U.S. PATENT DOCUMENTS 5,912,569 A * 6/1999 Alleven ..................... 327/108
6,351,809 B1 * 2/2002 St. Pierre et al. ............... 713/1

* cited by examiner

*Primary Examiner*—Vincent Q. Nguyen
(74) *Attorney, Agent, or Firm*—Robert D. Marshall, Jr.; W. James Brady; Frederick J. Telecky, Jr.

(57) ABSTRACT

An apparatus for detection of a USB host or a USB OTG device being attached to Vbus connector terminal of a USB device includes an attach detection pull down resistor isolated from the Vbus connector terminal. This attach detection feature guarantees USB attach detection and complies with current limits of both USB 1.1 and USB 2.0 OTG specifications.

4 Claims, 2 Drawing Sheets

USB ATTACH DETECTION FOR USB 1.1 AND USB OTG DEVICES

TECHNICAL FIELD OF THE INVENTION

The technical field of this invention is retrofit circuits enabling a USB 1.1 device to operate as a USB OTG device.

BACKGROUND OF THE INVENTION

Universal Serial Bus (USB) ports have been applied widely to connect peripheral devices to computers. Typical peripheral connections connected through USB are printers, scanners, zip drives, digital cameras, mice, joysticks, modems, speakers, telephones, video phones and network connections.

USB provides the plug-and-play feature to a broad range of peripherals in a variety of possible digital designs using USB. In normal system operation, when a USB device is attached to the USB bus, the USB host automatically detects that the device is attached and establishes communications. However, many USB designs do not guarantee this attach detection feature. When detection fails, USB users have to unplug the device connection and attempt insertion several times to get the USB host to recognize the device.

The standard for USB version 2.0 was released in April 2000 and is an upgrade for USB 1.1. USB 2.0 (High-speed USB) provides additional bandwidth for multimedia and storage applications. USB 2.0 has a data transmission speed of 480 megabits per second, 40 times faster than USB 1.1, which transmits data at 12 megabits per second. To allow a smooth transition for both consumers and manufacturers, USB 2.0 has full forward and backward compatibility with original USB devices and works with cables and connectors made for earlier versions of USB.

USB On-the-Go (OTG) is a new USB communication protocol specified in the USB 2.0 specification. USB OTG allows peer-to-peer communications between two USB OTG devices enabling, for example, a digital camera to directly communicate with a printer without the need of a PC as a host. USB On-the-Go (OTG) is a new USB communication protocol specified in the USB 2.0 specification. USB OTG allows peer-to-peer communications between two USB OTG devices enabling, for example, a digital camera to directly communicate with a printer without the need of a PC as a host. Generally a USB 1.1 device cannot directly communicate with a USB OTG device because of communication protocol differences between the two. As USB OTG is gaining popularity, the demand for USB 1.1 devices to communicate with USB OTG devices has created additional technical challenges.

The OTG supplement to the USB 2.0 specification uses the following defined terms:

Host USB device: a physical entity that is attached to a USB cable and acts in the role of initiating all data transmission transactions and provides periodic start-of-frame timing.

USB A-Device: supplies power to the Vbus power line. It is host at the start of a transaction session. It will relinquish the role of host to a dual-role B-Device to which it is connected by a USB cable. This can occur only under the rules determined by the host negotiation protocol (HNP).

USB B-Device: is always a peripheral at the start of a transaction session. B-devices may be single role (peripheral only) or dual-role (peripheral/host). Typically a B-Device requests a session according to USB 2.0 OTG session request protocol (SRP). If a B-Device is dual-role it may subsequently be granted the role of host from the A-Device under USB 2.0 OTG host negotiation protocol (HNP).

FIG. 1 illustrates a simplified conventional circuit used for the attachment of USB device 101 to be detected by USB host 102. The USB bus includes the four wire connections: Vbus 103; D+ 104; D− 105; and GND 106. A level shift circuit 108 reduces the 5V power supply input to the USB Device at node 109 to 3.3V across pull-up resistor 107 within the USB Device 101. If USB device 101 were not attached to the USB bus, USB data line D+ 103 and D− 104 on the host side would both be pulled down to ground level through respective pull down resistors 109 and 110. The Vbus line 103 would have no power drain in this state.

When USB device 101 is attached to the USB bus, the USB D+ data line 104 is pulled high to 3.3 volts through resistor 107. The USB host 102 senses device attach by detecting this signal change. This attach detection method on the USB device side is implementation dependent. Many USB Devices detect bus attach in this manner by simply sensing the presence of some measurable USB bus power on the Vbus line.

In USB suspend mode, where USB device 101 is attached but not in active use, the maximum current draw allowed by USB 1.1 devices from the Vbus is less than 500 µA. Specifications also require that a non-configured USB OTG (acronym for On-the-Go) device shall not draw more than 150 µA from the Vbus. Many proposed detection implementations are hard pressed to meet the USB specification requiring compliance with the low current-draw requirement, particularly in the USB suspend mode. It is even more difficult to meet the lower current draw requirements set by USB OTG specifications for devices attached directly to the USB bus. Even if the current draw requirement is met, it often happens that the device is not consistently accepted by the USB host and communications are not established.

SUMMARY OF THE INVENTION

The present invention is an attach detection circuit providing a low cost solution, which achieves reliable USB attach detection and meets current drain maximum limits required by both USB 1.1 and USB 2.0 OTG specifications. The circuit of the invention provides lower implementation cost, guaranteed USB attach detection and complete compliance with both USB 1.1 and USB 2.0 OTG specifications for USB attach detection.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
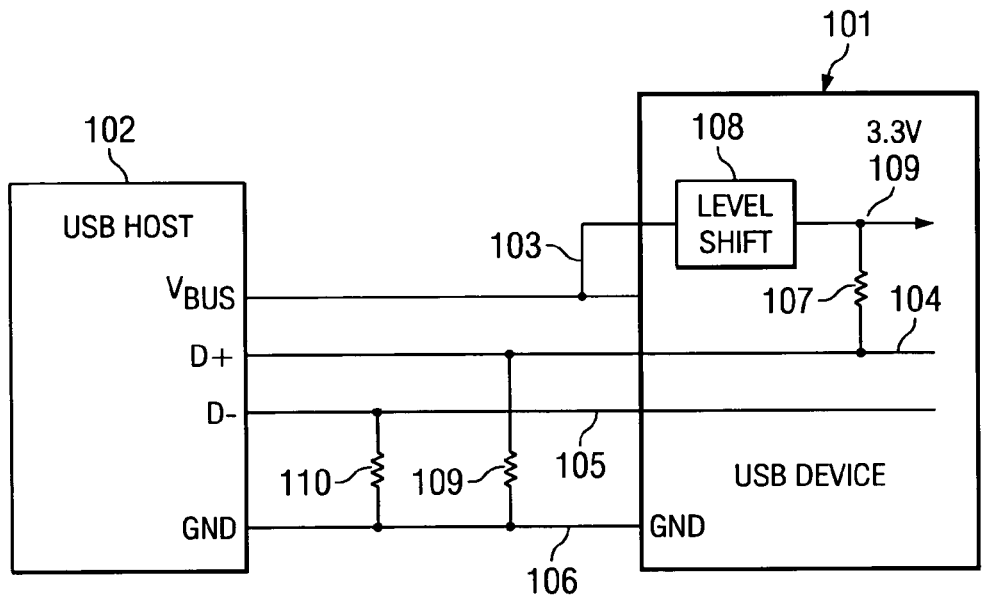
FIG. 1 illustrates a simplified conventional attach detect circuit for USB devices (Prior Art)
Figure 2:
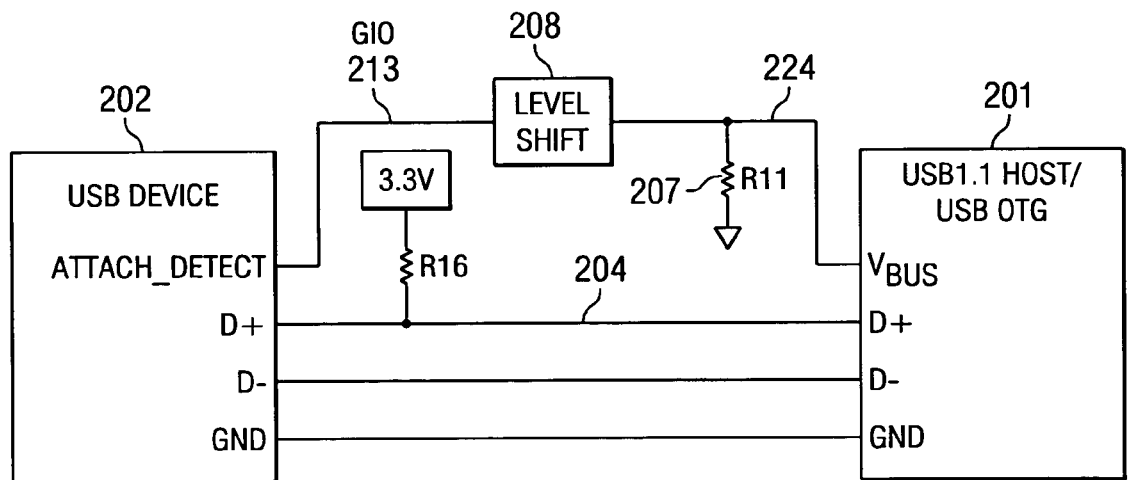
FIG. 2 illustrates an improved circuit diagram of the USB attach detection method for USB 1.1 or USB 2.0 OTG devices (Prior Art)

FIG. 2 illustrates a conventional design for USB attach detection that causes inconsistent attach detection. Level shift device 208 performs 5.0 volts to 3.3 volts voltage conversion. Input voltage Vbus at node 224 is nominally 5.0 volts. The output voltage on 213 (GIO) is 3.3 volts. When the USB device 201 is not attached to the bus, GIO 213 detects low as R11 207 pulls the Vbus input 224 to low. When the USB Device 201 is attached to the USB connector, Vbus 224 drives input 213 GIO high to 3.3 volts. In USB suspend mode, an USB 1.1 device connected as block 201 is allowed to draw less than 500 µA from the Vbus 224. The pull down resistor R11 207 must therefore be greater than 10.5 KOhms. A non-configured USB OTG device 201 is allowed to draw up to 150 µA from Vbus 224. This requires the pull down resistor 207 (R11) to be greater than 35 KOhms. Assume resistor 207 is 40 KOhms. Then a typical leakage current of 150 µA will set the input level at node 224 to a marginal logic high threshold of 0.8 volts at Vbus, node 224 when the USB device 202 is not attached. A large resistor assigned to 207 in this type of design results in faulty attach detection and potentially the occurrence of a lock up in the system.

This marginal logic level input causes some USB attach detection functions to operate intermittently. An even more difficult requirement on USB OTG Vbus leakage voltage at node is to be less than 0.2 volts. In this case, even a 10 KOhm resistor for 207 is not small enough to pull Vbus down to 0.2 volts when there is 200 µA leakage current. To minimize static noise, a smaller resistor 207 must be used to avoid faulty attach detection. Some designs simply use a small pull down resistor for resistor 207 to make attach detection work, but this fails to comply with USB specifications for power drain on Vbus. This condition may not be accepted by all possible USB 1.1 hosts and will certainly not be accepted by USB OTG devices.

Many conventional designs pull up the D+ data line directly to system 3.3 volts, as illustrated in FIG. 2. This could result in two additional problems. First, if the system is busy processing other time-critical tasks when the USB device is attached to the USB bus, the system may not be able to immediately execute USB attach codes. However, when the USB host detects a new USB device attached to the bus, it will proceed to USB initialization immediately. When a USB device cannot respond to setup package sent from the host, the host assumes the device 202 is malfunctioning and will suspend the port to which the device is attached. USB communication will not be established for the attached device. This scenario often requires USB device users to unplug the device and then plug the connector back in to start it over. This may take several trials before USB communication can be established.

Figure 3:
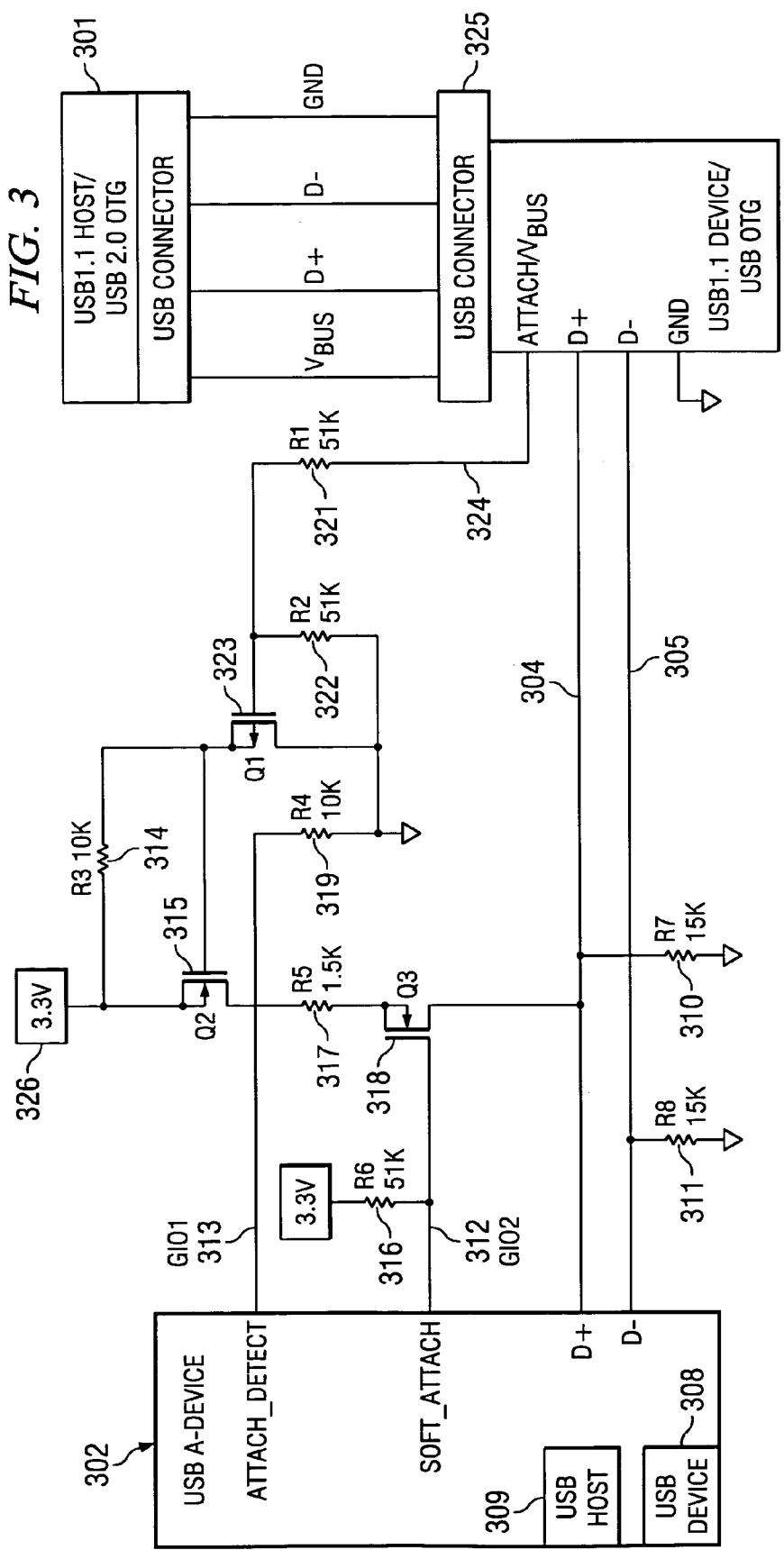
FIG. 3 illustrates the full circuit diagram of the USB attach detection method of this invention for USB 1.1 or USB 2.0 OTG devices.

FIG. 3 illustrates this invention for USB attach detection of USB 1.1 or USB 2.0 OTG devices. In this schematic, USB A-device 302 includes both a USB Device function 308 and USB host function 309. Depending on its configuration, the USB port 325 could function as either a USB host or a USB device. In FIG. 3 shows an A-connector, which determines that USB A-device 302 is a default host. The invention works equally well with USB A-device 302 including a USB host and a USB device function supporting both USB 2.0 OTG and USB 1.1 devices.

As illustrated in FIG. 3, when the USB cable is connected to an USB 1.1 host 301 via USB A-connector 325, transistor 323 (Q1) is turned ON by the bus power. A 5.0 volt minimum source on the Vbus line 324 is passed to transistor 323 (Q1) through a resistor divider including resistors 321 (R1) and 322 (R2). Resistor 314 (R3) limits the current through transistor 323 (Q1). As a result transistor 315 (Q2) turns ON and 3.3 volt system power from voltage source 326 is applied to GIO1 node 313. This is the attach_detect input 313 of USB A-device 302. The level change on GIO1 node 313 signals the presence of an attach_detect input at GIO1 node 313 to the USB host 309. A-device 302 then pulls the soft_attach GIO2 line 312 low turning ON transistor 318 (Q3) causing one of the data lines, either D+ line 304 or D− line 305, to go to 3.3 volts as supplied by voltage supply 326. In FIG. 3, D+ line 304 is pulled to high to indicate full speed connection. Pull up resistor 318 (R6) ensures that transistor 317 (Q3) is OFF in the absence of a low output from soft_attach GIO2 line 312. Resistors 310 (R7) and 311 (R8) pull down the respective D+ and D− lines when the soft_attach output is in the low state and transistor 317 (Q3) is OFF. For low speed connection, the processor instead pulls D− line 305 to high level. When the USB device 301 is disconnected, both transistor 323 (Q1) and transistor 315 (Q2) are turned OFF. This results in GIO1 node 313 being pulled to ground through resistor 319 (R4). The level change on GIO1 node 313 from high to low allows detection of detachment by host A Device 302.

In USB suspend mode, the maximum current draw from the Vbus line must be less than 60 µA through resistors 321 (R1) and 322 (R2) (5 volts at 102 KOhms is less than 50 µA) and the transistor 323 (Q1) (less than 10 µA). This meets both maximum current draw limits set by both USB 1.1 specifications, (less than 500 µA) and USB OTG specifications (less than 150 µA).

The circuit of this invention in FIG. 3 solves this design because the pull down resistor 319 (R4) does not draw any USB Vbus current. Because resistor 319 (R4) is isolated from the USB Vbus, designers may choose any small value for R4 as long as there is sufficient system power available under powered-up conditions. A typical design would use 10 KOhms for R4. The current drain through the series connection of resistor 321 (R1) and resistor 322 (R2) is less than 50 µA from the USB Vbus. This meets both USB 1.1 and USB OTG current drain limitation.

This invention as illustrated in FIG. 3 provides a solution that guarantees USB attach detection will be successful. When the USB device 302 is attached to the USB bus, Vbus turns on transistors 323 (Q1) and 315 (Q2). This results in level change on GIO1 node 313, which signals the device USB attach. Once the device 301 is ready to respond to USB host 302, USB data line D+ 304 is pulled to 3.3 volts through transistor 318 (Q3) by the device driving GIO2 line 312 to a low level. In the present design, the device actually controls when the host should start sending USB setup packets. Software can control USB attach/detach to the USB bus to mimic the possibility that a USB device user might unplug and then plug back the connector to the USB bus.

Secondly, some self-powered USB devices do not follow USB 1.1 Section 7.1.5 or USB 2.0 Section 7.1.5.1 which states: "The voltage source on the pull-up resistor must be derived from or controlled by the power supplied on the USB cable such that when Vbus is removed, the pull-up resistor does not supply current on the data line to which it is attached." The conventional attach detect circuit illustrated in FIG. 2 violates this requirement and has been observed to pull-up D+ line or D− line as long as they have power applied to them, without regard to the presence of Vbus.

The recommended process for handling attach detection by USB 1.1 and USB 2.0 OTG specifications is to start a session upon detecting D+/D− high, enumerate the device, determine that it is not supported and turn off Vbus. No USB communication will be established as a result. In the invention illustrated if FIG. 3 this will not happen. The data line pull up resistor 317 (R5) to 3.3 volts is switched by the USB Vbus. When USB power is not present, transistor 315 (Q2) is turned OFF and the D+ data line 304 is not pulled up.

What is claimed is:

1. An apparatus for detection of a USB host or a USB OTG device being attached to Vbus connector terminal of a USB device, comprising:

an attach detection pull down resistor (319) isolated from the Vbus connector terminal (324);

a first resistor (321) having a first terminal connected to the Vbus connection terminal (324) and a second terminal;

a second resistor (322) connected between said second terminal of said first resistor (321) and ground;

a PMOS transistor (323) having a source, a gate connected to said second terminal of said first resistor and a drain connected to ground;

a third resistor (R3) connected between a voltage source (326) and said drain of said PMOS transistor (323);

an NMOS transistor (315) having a source connected to said voltage source (326), a gate connected to said source of said PMOS transistor (323) and a drain connected to an attach detect input (313) of the USB device (302); and wherein said attach detection pull down resistor (319) is connected between said attach detect input (313) and ground.

2. The apparatus of claim 1, further comprising:

a second NMOS transistor (318) having a source, a gate connected to a soft attach output (312) of said USB device (302) and a drain connected to a data line (304); and a data line pull up resistor (317) connected between said drain of said NMOS transistor (315) and said source of said second NMOS transistor (318).

3. The apparatus of claim 2, further comprising:

a soft attach output pull up resistor (318) connected between the power source and the soft attach output (312).

4. The apparatus of claim 2, further comprising:

a data line pull down resistor (310) connected between the data line (304) and ground.

\* \* \* \* \*